United States Patent [19]
Palma

[11] 3,951,813
[45] Apr. 20, 1976

[54] FLUID SEPARATOR OR MIXER

[76] Inventor: James R. Palma, 1502 Curry Road, Schenectedy, N.Y. 12306

[22] Filed: July 2, 1973

[21] Appl. No.: 375,623

[52] U.S. Cl.............................. 210/374; 210/512 R; 209/211
[51] Int. Cl.²......................................... B01D 33/00
[58] Field of Search................... 210/374, 512, 304; 209/211

[56] References Cited
UNITED STATES PATENTS

| 2,705,053 | 3/1955 | Morris | 210/512 |
| 2,889,044 | 6/1959 | Cloos | 209/211 |
| 3,168,466 | 2/1965 | Milne | 210/512 |
| 3,706,383 | 12/1972 | Palma | 210/512 |
| 3,768,658 | 10/1973 | Palma | 210/512 |

Primary Examiner—Charles N. Hart
Assistant Examiner—Ernest G. Therkorn
Attorney, Agent, or Firm—Oltman and Flynn

[57] ABSTRACT

A fluid separator or mixer having a rotatable spiral conduit with transverse interior abutments with openings therein providing fluid communication between the interior of the conduit and the outside.

15 Claims, 5 Drawing Figures

FLUID SEPARATOR OR MIXER

BACKGROUND OF THE INVENTION

In U.S. Pat. No. 3,706,383, I have disclosed and claimed a fluid separator with a rotatable spiral conduit inside a housing. The spiral conduit has interior transverse abutments positioned in the path of fluid flow through the conduit and openings near these abutments for the escape of heavier constituents of the fluid stream flowing through the rotating spiral conduit.

In my co-pending U.S. patent application, Ser. No. 312,041, filed Dec. 4, 1972, and entitled "Separator", now U.S. Pat. 3,768,658, I have disclosed and claimed a modified arrangement having an internal cylindrical wall which extends between and joins successive turns of the rotatable spiral conduit so that three fluid passageways are provided: the interior of the spiral conduit itself; the space inside the internal cylindrical wall (at the inside of the spiral turns of the conduit); and the annular space between this internal wall and the outer housing (at the outside of the spiral turns of the conduit). The spiral conduit has interior abutments and nearby openings at the outside or the inside, or both, of its turns to enable the separation of fluid constituents introduced into the spiral conduit, and/or into the annular space outside its turns, and/or into the generally cylindrical space inside its turns.

SUMMARY OF THE INVENTION

The present invention is directed to a modification of the apparatus disclosed in my U.S. Pat. No. 3,706,383 in which the openings in the spiral conduit are provided in the transverse interior abutments themselves to promote the fluid-separating or fluid-mixing action, depending upon whether the apparatus is used as a separator or as a mixer.

Accordingly, it is a principal object of this invention to provide a novel and improved apparatus for use as a fluid separator or as a mixer.

Another object of this invention is to provide such an apparatus in which a rotating spiral conduit with interiorly projecting abutments along its length has openings in these abutments for promoting the fluid separating or mixing action.

Further object and advantages of this invention will be apparent from the following detailed description of certain presently-preferred embodiments thereof which are illustrated in the accompanying drawing in which.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation. The term "fluid", as used herein, embraces a gas or a liquid or a particulate solid that is capable of flowing freely.

Figure 1:
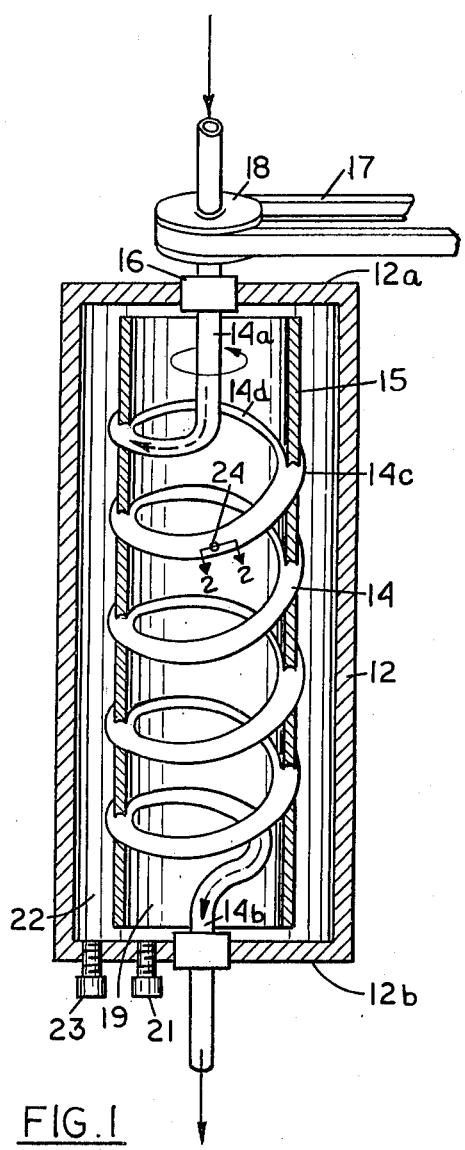
FIG. 1 is a vertical section taken centrally through an apparatus embodying the present invention.

Referring first to FIG. 1, the apparatus comprises an outer housing 12, which preferably is cylindrical, and a spiral conduit 14 that is rotatable about a vertical axis extending centrally inside this housing. This conduit preferably is cylindrical in cross-section and of uniform cross-sectional diameter along its length. The turns of the conduit preferably are of the same size and are evenly spaced apart. However, the spiral turns may be non-uniform in diameter and unequally spaced apart, if desired.

The spiral conduit has an offset, centrally located, vertical upper end 14a which is rotatably received in a bearing 16 in the horizontally disposed top wall 12a of the outer housing. Similarly, the spiral conduit has an offset, centrally located, vertical lower end 14b which is rotatably received in a similar bearing 16 in the horizontal bottom wall 12b of the outer housing. The spiral conduit 10 is driven from a motor (not shown) through a belt 17 and a pulley 18 attached to its upper end above the housing 12.

When the apparatus is used as a fluid separator, the fluent material to be separated may be supplied directly to the upper end of the spiral tube, as indicated by the arrow above the pulley 18 in FIG. 1.

In the embodiment illustrated, an annular wall 15 is provided extending between and joining the successive turns of the spiral conduit 14. The spiral conduit is exposed at the inside of its turns inside this annular wall and also is exposed at the outside of its turns outside this annular wall. At its upper and lower ends, the annular wall 15 has a rotatable running fit with the top wall 12a and the bottom wall 12b of the outer housing such that the annular wall 15 can rotate in unison with the spiral conduit 14 inside the stationary housing 12, but there is little or no fluid leakage between the wall 15 and the housing 12 at either end. The clearance between them at the top and bottom is greatly exaggerated in FIG. 1.

A fluid fitting 21, which is threadedly received in the bottom wall 12b of the outer housing 12, communicates with the generally cylindrical space 19 inside the annular wall 15 and inside the turns of the spiral conduit 14. Another fluid fitting 23, which is threadedly received in the housing bottom wall 12b, communicates with the annular space 22 inside the outer housing 12 around the outside of the annular wall 15 and outside the turns of the spiral conduit 14.

The spiral conduit is formed with a plurality of openings, only one of which is shown at 24 in FIG. 1. These openings are located on the outer circumference of the turns of the spiral conduit, at the outside of the annular wall 15, so as to provide fluid communication between the interior of the spiral conduit 14 and the annular space 22. Preferably, these openings are evenly spaced apart at desired intervals along the spiral length of the conduit 14.

In accordance with the present invention these openings 24 are formed in abutments which project transversely into the interior of the spiral conduit 14. These internal abutments may take various forms.

Figure 2:
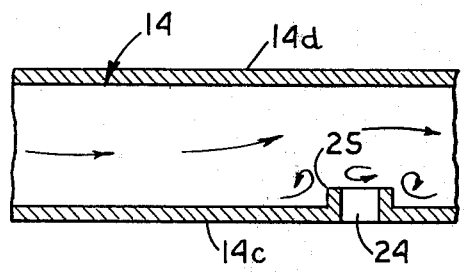
FIG. 2 is an enlarged section taken longitudinally along the spiral conduit in this apparatus, at the line 2 — 2 in FIG. 1.

As shown in FIG. 2, the abutment 25 is circular in cross-section and projects perpendicular to the conduit wall 14c at the outside circumference of the spiral conduit, and the opening 24 is circular and extends centrally through this abutment. Alternatively, the interiorly-projecting abutment 25 and the central opening 24 therein may be square or rectangular in cross-section.

Figure 3:
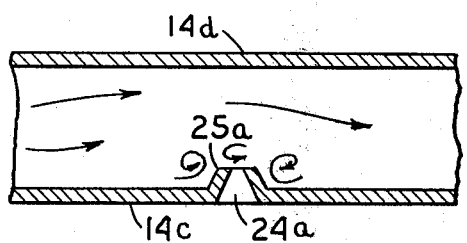
FIG. 3 is a view similar to FIG. 2 but showing a modified configuration of the interior abutment in the spiral conduit.

FIG. 3 shows an alternative abutment arrangement in which both the abutment 25a and the central opening 24a therein are frusto-conical, with the cone axis extending radially of the spiral conduit and with the cone tapering inwardly toward the inside of the spiral conduit.

Figure 4:
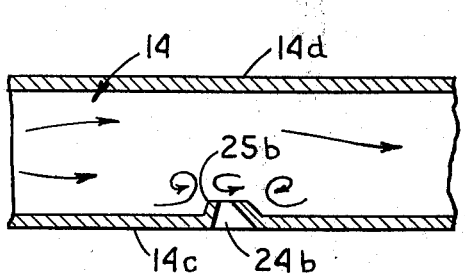
FIG. 4 is a similar view showing a different interior abutment.

FIG. 4 illustrates another form of the interior abutments on the spiral conduit in which the abutment 25b is more nearly perpendicular to the outside wall 14c of the spiral conduit at the upstream side than at the downstream side, and the central opening 24b in this abutment has similar unequal inclinations at the upstream and down stream sides.

Figure 5:
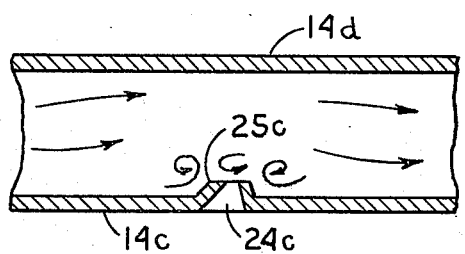
FIG. 5 is a similar view showing yet another different interior abutment in the spiral conduit.

FIG. 5 shows yet another embodiment of the abutments on the spiral conduit which is essentially the reverse of the FIG. 4 arrangement — i.e., at its downstream side the abutment 25c is more nearly perpendicular to the conduit wall than at its upstream side, and the opening 24c in this abutment is similarly inclined unequally at the upstream and downstream sides.

The interiorly projecting abutments on the spiral conduit 14 are in the path of the fluid stream which flows down along the spiral length of this conduit and is urged radially outward toward the outside wall 14c of this conduit be centrifugal force due to the rotation of the conduit. The impingement of the fluid stream against each such abutment creates localized swirls, eddy currents, or vortices flowing substantially parallel to the outside wall 14c of the conduit. These eddy currents or vortices tend to promote the escape of the heavier constituents of the fluid stream from the interior of the spiral conduit out through the central openings in the abutments into the annular space 22 surrounding the spiral conduit. For example, these heavier constituents may be solid particles contaminating a gas or a liquid.

Thus, when the apparatus is used as a fluid separator the fluid stream, containing both heavier and lighter constituents, is introduced into the upper end of the spiral conduit, and the lighter constituents remain inside the spiral conduit and are discharged through its lower end 14b while the heavier constituents escape through the openings at the abutments in the spiral conduit for removal at the fluid fitting 23 in the bottom wall of the outer housing. When the apparatus is so used, the other fluid fitting 21 may be closed or omitted, and the annular wall 15 also may be omitted.

If desired, the interior abutments and the openings therein may be located at the inside circumferential wall 14d of the spiral turns of the conduit, instead of at the outside wall 14c, as shown in FIG. 1. In that case, the lighter constituents in the fluid stream tend to escape from the interior of the spiral conduit at these inside openings because such lighter constituents would be less influenced by centrifugal force, which tends to displace the heavier constituents toward the ouside wall 14c of the spiral conduit.

Under certain circumstances, the apparatus may be used to separate constituents of the fluid stream which have three different density ranges. By providing interior abutments with openings therein at both the inside wall 14d and the outside wall 14c of the turns of the spiral conduit 14, when the conduit is rotated the lightest constituents of the fluid stream in the conduit tend to escape through the openings in the inside wall 14d, the heaviest constituents escape through the openings in the ouside wall 14c because of centrifugal force, while the constituents of intermdiate density tend to remain inside the spiral conduit. Consequently, the intermediate density constituents may be withdrawn through the lower end 14b of the spiral conduit, the heaviest constituents may be withdrawn through the fitting 23 from the annular space 22 around the outside of the spiral conduit, and the lightest constituents may be withdrawn through the fitting 21 from the space inside the annular wall 15.

The present apparatus also may be used for mixing fluids of different densities. One fluid may be introduced directly into the spiral conduit, either at its upper end or at its lower end 14b. Another fluid of different density may be introduced into the annular space 22 around the outside of the spiral conduit or into the space 19 at the inside of the spiral conduit.

If the internal abutments on the spiral conduit project far enough into it to produce a venturi effect in the spiral passageway through the interior of this conduit, the fluid that is introduced directly into one end of this conduit may be at higher pressure than the fluid that is introduced exteriorly of the conduit (either outside its turns or inside its turns).

Alternatively, where the internal abutments do not produce a significant venturi effect, the fluid introduced exteriorly of the spiral conduit should be at higher pressure than the fluid introduced directly into one end of the conduit. d By various combinations of fluid pressures and internal transverse abutments at the inside and outside cicumferential walls of the spiral conduit, this apparatus may be used to mix three fluids of different densities, which are introduced into the apparatus, respectively, directly into one end of the spiral conduit, into the space 19 inside the wall 15 at the inside of the turns of the spiral conduit, and into the space 22 at the outside of these turns.

When the apparatus is used as a mixer of fluids of different densities, the mixing action may be accelerated and enhanced by heating the annular wall 15, which conducts heat to the spiral conduit 14 in which the mixing takes place. For this purpose, the wall 15 preferably is of suitable metal of high heat conductivity. The wall 15 may be heated electrically or inductively, if desired. The conduit 14 may be heated. The wall 15 and/or conduit 14 alternatively may be cooled. It is possible to heat the center of the conduit and cool the outside, or vice versa. The heating or cooling of wall 15 and conduit 14 may be applied to a separator of the type previously described. In some circumstances, both separating and mixing may be possible in the same apparatus.

I claim:

1. In a separator-mixer for fluent substances having an outer housing, and a spiral conduit rotable inside said outer housing, said conduit having transverse abutments that project into the interior of the conduit at spaced locations along its length and have inner ends, the improvement wherein said abutments have openings therein at said inner ends which provide fluid communication between the interior of said conduit and the outside.

2. A separator-mixer according to claim 1, wherein said abutments project into the interior of the spiral conduit from the outer circumference thereof.

3. A separator-mixer according to claim 1, wherein said abutments project into the interior of the spiral conduit from the inner circumference thereof.

4. A separator-mixer according to claim 1, wherein said abutments with the openings therein are substantially cylindrical.

5. A separator-mixer according to claim 1, wherein each abutment has wall portions on opposite sides of the opening therein, lengthwise of the conduit, which are oppositely inclined to the adjoining conduit wall.

6. A separator-mixer according to claim 5, wherein said abutments with the openings therein are substantially frustoconical.

7. A separator-mixer according to claim 5, wherein said oppositely inclined wall portions of each abutment extend at unequal opposite angles to the adjoining conduit wall.

8. A separator-mixer according to claim 1, and further comprising an annular wall inside said housing which extends between and joins the successive turns of the spiral conduit and provides therewith a fluid passageway at the inside of said turns, and together with said outer housing and said turns provides an annular fluid passageway at the outside of said turns.

9. A separator-mixer accordin to claim 8, wherein said annular wall is heated and conducts heat to said conduit.

10. A separator-mixer according to claim 8, wherein said abutments project into the interior of said spiral conduit from the inner circumference thereof, and said openings extend through the respective abutments from the inner circumference of the spiral conduit to the inner ends of the abutments interiorly of the conduit.

11. A separator-mixer according to claim 8, wherein certain of said abutments project from the outer circumference of the spiral conduit into its interior and the openings therein are open at the outside of said annular wall, and others of said abutments project from the inner circumference of the spiral conduit into its interior and the openings therein are open at the inside of said annular wall.

12. A separator-mixer according to claim 8, wherein said abutments project from the outer circumference of the spiral conduit into its interior and the openings therein are open at the outside of sail annular wall.

13. A separator-mixer according to claim 1, wherein said conduit is heated.

14. A separator-mixer according to claim 1, wherein said conduit is cooled.

15. A separator-mixer according to claim 1, wherein a portion of said conduit is heated and another portion of said conduit is cooled.

* * * * *